United States Patent
Jardetzky et al.

(10) Patent No.: US 6,392,989 B1
(45) Date of Patent: May 21, 2002

(54) HIGH SPEED PROTECTION SWITCHING IN LABEL SWITCHED NETWORKS THROUGH PRE-COMPUTATION OF ALTERNATE ROUTES

(75) Inventors: Paul Wenceslas Jardetzky, Stanford; Jaroslaw Joseph Sydir, San Jose; Balaji Srinivasan, Santa Clara, all of CA (US)

(73) Assignee: CPlane Inc., Sunnyvale, CA (US)

( * ) Notice: Subject to any disclaimer, the term of this patent is extended or adjusted under 35 U.S.C. 154(b) by 29 days.

(21) Appl. No.: 09/595,247

(22) Filed: Jun. 15, 2000

(51) Int. Cl.[7] .............................................. G01R 31/08
(52) U.S. Cl. ............................ 370/216; 370/217; 714/4
(58) Field of Search ................................ 370/216, 217, 370/218, 219, 220, 221, 224, 392, 413, 228, 244, 227, 225; 709/239; 714/2, 4, 25, 43, 47; 340/825.01, 506, 507, 527, 529

(56) References Cited

U.S. PATENT DOCUMENTS

| | | | |
|---|---|---|---|
| 4,853,927 A | 8/1989 | Wenzel | 370/218 |
| 5,029,158 A | 7/1991 | Reid et al. | 370/226 |
| 5,058,105 A | 10/1991 | Mansour et al. | 370/228 |
| 5,146,452 A | 9/1992 | Pekarske | 370/228 |
| 5,182,744 A * | 1/1993 | Askew | 370/228 |
| 5,241,534 A | 8/1993 | Omuro et al. | 370/218 |
| 5,398,236 A | 3/1995 | Hemmady et al. | 370/218 |
| 5,444,693 A | 8/1995 | Arslan et al. | 370/221 |
| 5,463,615 A * | 10/1995 | Steinhorn | 370/221 |
| 5,581,543 A | 12/1996 | Natarajan | 370/221 |
| 5,832,197 A * | 11/1998 | Houji | 395/182.02 |
| 5,850,505 A | 12/1998 | Grover et al. | 714/4 |
| 5,856,981 A | 1/1999 | Voelker | 714/712 |
| 6,061,735 A * | 5/2000 | Rogers | 709/239 |
| 6,167,025 A * | 12/2000 | Hsing | 370/216 |
| 6,188,666 B1 * | 2/2001 | Cornell | 370/217 |

* cited by examiner

Primary Examiner—Douglas Olms
Assistant Examiner—Ricardo M. Pizarro
(74) Attorney, Agent, or Firm—Oppenheimer, Wolff & Donnelly LLP (57) ABSTRACT

Method of providing a recovery plan for a connection in a communications network when the connection is disrupted by a failure of a switch, switch or link in the network. In a provisioning phase, a primary plan and recovery plan for a connection to be protected in a communications network are developed. Forwarding information in the form of mapping or forwarding tables is derived from the plans and is distributed to each of the switches in the network. In the event of a failure each switch receives notice of the failure and switches to the recovery plan related to the failure. If and when the failure is repaired or cleared, each switch then switches back to its primary plan. Determining a recovery plan during the provisioning phase is based on the rule that a unit of failure is a switch or group of switches in the network rather than a link, regardless of the actual cause of the failure. This simplifies the mapping tables at each switch and reduces the time for each switch to switch to a recovery plan based on the failure as reported by the other switches in the network. Recovery plan routes are based on a quality of service metric such as the metric of not exceeding a predetermined fraction of the capacity of the links involved in the recovery plan routes.

39 Claims, 7 Drawing Sheets

(A)
Primary Mappings

| Switch | Input | Output |
|---|---|---|
| 110-1 | Any | 200-1:a |
| 110-2 | 200-1:a | 200-9:a |
| 110-7 | 200-9:a | 200-12:a |
| 110-8 | 200-12:a | Any |

(B)
Recovery Mappings
(Failure of 100-2)

| Switch | Input | Output |
|---|---|---|
| 110-1 | Any | 200-4:a |
| 110-5 | 200-4:a | 200-6:a |
| 110-6 | 200-6:a | 200-8:a |
| 110-7 | 200-8:a | 200-12:a |
| 110-8 | 200-12:a | Any |

(C)
Recovery Mappings
(Failure of 100-7)

| Switch | Input | Output |
|---|---|---|
| 110-1 | Any | 200-1:a |
| 110-2 | 200-1:a | 200-2:a |
| 110-3 | 200-2:a | 200-3:a |
| 110-4 | 200-3:a | 200-13:a |
| 110-8 | 200-13:a | Any |

FIG. 5

HIGH SPEED PROTECTION SWITCHING IN LABEL SWITCHED NETWORKS THROUGH PRE-COMPUTATION OF ALTERNATE ROUTES

FIELD OF THE INVENTION

This invention relates generally to generation and distribution of routing information in a communications network to create a fault-tolerant network and more particularly to methods of rerouting protected connections in a communications network in the event of a failure of a link or switch of the network.

DESCRIPTION OF THE RELATED ART

Dependence on communications networks today is increasing as both voice, video and data traffic over these networks increases. Communications networks, once thought to be a convenience, are now becoming a necessity. However, as this dependence on communications networks increases, the reliability of the communications network becomes a major issue. Failures in the network can cause the loss of large amounts of information and impact a significant amount of commerce that relies on the integrity of the network.

Recognition of the failure condition of a communications network and a response to the failure condition are important functions that must be integrated into the operations of any communication network. Parameters such as the time to recover from a failure condition, the probability of recovering from a failure condition, and the amount of capacity in the telecommunications network that must be dedicated to handling a failure condition give an indication of the quality of fault tolerance for a communications network.

One kind of communications network that is hard hit by a failure is a label switched network. Such a network has the characteristic that a circuit is used to interconnect source and destination elements outside the network. A circuit, in this context, is a physical or virtual connection established over a series of links and switches in the network. When a circuit is disrupted by a failure, all of the communications traveling over the circuit are disrupted and some kind of failure recovery system is needed to permit the original circuit traffic to flow through the network from its source to its destination.

Use of spare physical links in the network, which are normally idle, is one category of failure recovery method. This technique takes advantage of unused capacity in the network to bypass physical links in the network that have been determined to be out-of-service due to some failure condition.

An aim of the physical recovery technique is to be transparent to individual connections so that equipment located at the ends of a connection need not take any part in failure recovery. This type of recovery is also very fast because the amount of failure reporting and failure processing is independent of the number of connections traversing the network and because restoration capacity can be provided based on the physical configuration of the network rather than on the actual pattern of connections.

One drawback of the physical recovery technique is that double the capacity is required so that all connections using a particular failed link can be moved onto the spare link. The spare link remains idle during the time that it is not being used to restore a failure condition in the network. This limits flexibility in optimizing network usage and limits the sharing of the back-up link for different, independent failure conditions (known as restoration bandwidth multiplexing). Also, there is no ability to give higher priority to restoring some of the connections which required the use of the failed link. Thus, the physical recovery technique requires excess capacity in the network, capacity which could be used to improve the overall utilization of the network.

Another category of failure recovery is a technique by which one end of a connection takes responsibility for recovery of the failure interrupting the connection by re-signaling the connection through the network. Connection-based recovery allows for more efficient use of network resources because a series of links used for the recovery route can be completely independent of the original set of links in the primary route and because the granularity of recovery is smaller. A connection uses only a fraction of each link's capacity in its route through the network.

This category of recovery also has certain drawbacks. One drawback is the appreciable size of the processing and communication load placed on the network to re-establish all of the failed connections. Another drawback is the time to effect a restoration of the connections, typically more than a round trip time for each connection through the network from the source switch to the destination switch. However, this method does not require that the network have the capacity to reroute all connections, and so does not suffer from the disadvantage of idle capacity dedicated to failure recovery. If dedicated failure recovery capacity does exist in the network for this category of recovery, it can be shared for different connections and different failure conditions.

Based on the above there is a need for a failure-recovery method and apparatus that rapidly restores one or more selected connections from a failure condition and that does not require double the capacity in the communications network to effect the restoration of disrupted connections.

BRIEF SUMMARY OF THE INVENTION

The present invention is directed to satisfying the above need. A method in accordance with the present invention includes, in a communications network having switches and transmission links that connect to the switches, the steps of providing mapping information to each switch to implement primary and recovery plans for the connection, where the recovery plans include routes derived under the assumption that switches associated with the failure are not present in the network and then transmitting a report from each switch that detects a failure. Next, at each switch a failure condition is determined from the failure report, where the failure condition is a switch associated with the failure and at each switch and based on the failure condition, mapping information is selected that implements a recovery plan for the connection.

Another method in accordance with the present invention includes, in a communications network having switches and transmission links that connect to the switches, the steps of creating a representation of the topology of the communications network and then injecting a failure into the network representation. Next, the representation is modified by removing from the representation a switch that is associated with the failure and all links connected to the switch. A recovery route through the representation of the modified network is then determined after which recovery actions, in the form of mapping information, are derived for each switch in the recovery route.

An advantage of the present invention is that the time-consuming process of finding recovery routes through the network for failed switches or links is performed during a pre-failure planning process, thus eliminating this time from an actual recovery and speeding the recovery process when a failure occurs. Independent recovery actions performed at each switch allow for restoration to proceed in parallel in each switch.

Another advantage is that half the capacity in the network does not need to be set aside to handle failures. Instead, the pre-failure planning uses the existing capacity and a smaller amount of idle capacity in the network to find recovery routes. Additionally, this method and can pre-plan the successful rerouting of all connections, guaranteeing that there exists backup capacity to re-route all failed connections.

Another advantage is that either a central site or each switch in the network can implement the recovery plan because the recovery action at each switch is simple, being based only on the failure reports reported by switches in the network that detect a failure.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1A:
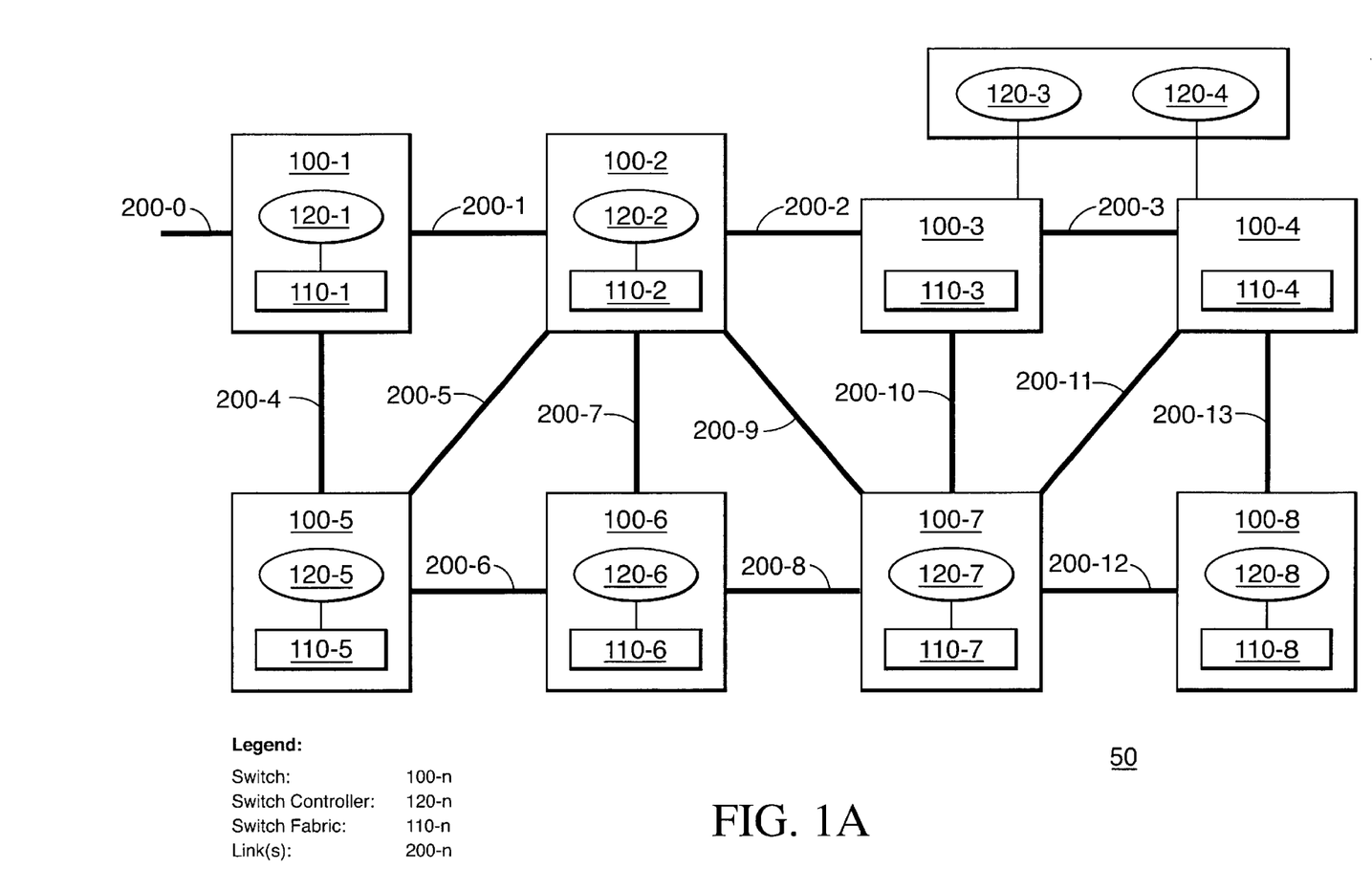
FIG. 1A shows a representative communications network having a set of switches and a set of links that connect to the switches.

FIG. 1A shows a representative communications network having a set of switches and a set of links that interconnect to the switches. In FIG. 1A switches 100-1, 100-2, 100-3, 100-4, 100-5, 100-6, 100-7 and 100-8 are interconnected in a typical fashion by links 200-1, 200-2, 200-3, 200-4, 200-5, 200-6, 200-7, 200-8, 200-9, 200-10, 200-11, 200-12, 200-13 to form a network 50. It should be noted that the network 50 depicted is only sparsely connected and can have more or fewer links that connect to the switches without affecting the present invention. Each switch 100 includes a hardware switch fabric 110 and a software switch controller 120. The switch controllers can reside outside the switch on a general purpose computation platform which is shared by two or more fabrics 110 such as is shown in FIG. 1A for switches 100-3 and 100-4.

A switch fabric 110 as used herein is multi-port and is capable of implementing a bi-directional path from one port to any other port using a mapping or forwarding table that contains the path information in the switch. In one embodiment of the present invention, a switch may be a virtual switch, i.e., a virtual partition of a physical switch. This means that a portion of the resources of the physical switch are collected together and configured to operate as an independent switch, in a way that is otherwise indistinguishable from the entire physical switch. A switch-controller 120 is a computing system that operates to establish paths through the switch fabric 110 by programming the mapping table in the switch. Switch controllers can be integrated with the hardware switches or separate or remote from the switches they control.

Figure 1B:
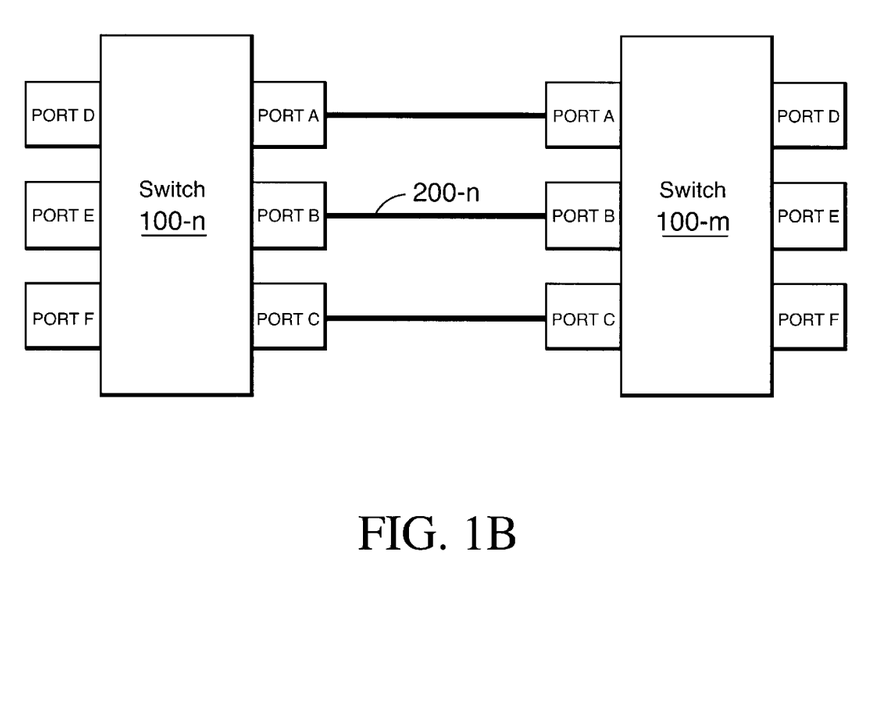
FIG. 1B shows a detail of one switch connected to another switch via a link which includes several port-to-port connections between the switches.

FIG. 1B shows each switch 100 typically having one or more physical ports, a, b, c, each of which is used to terminate a physical connection between switches in the switch. A link is the physical connection of one port to another port between adjacent switches. Multiple links between switches may be present, but for the purposes of routing connections, the capacity of each link is considered individually. In one embodiment of the present invention, a link is a virtual partition of a physical link, i.e., an arbitrary subset of the bandwidth of a physical link with quality of service guarantees.

Figure 2:
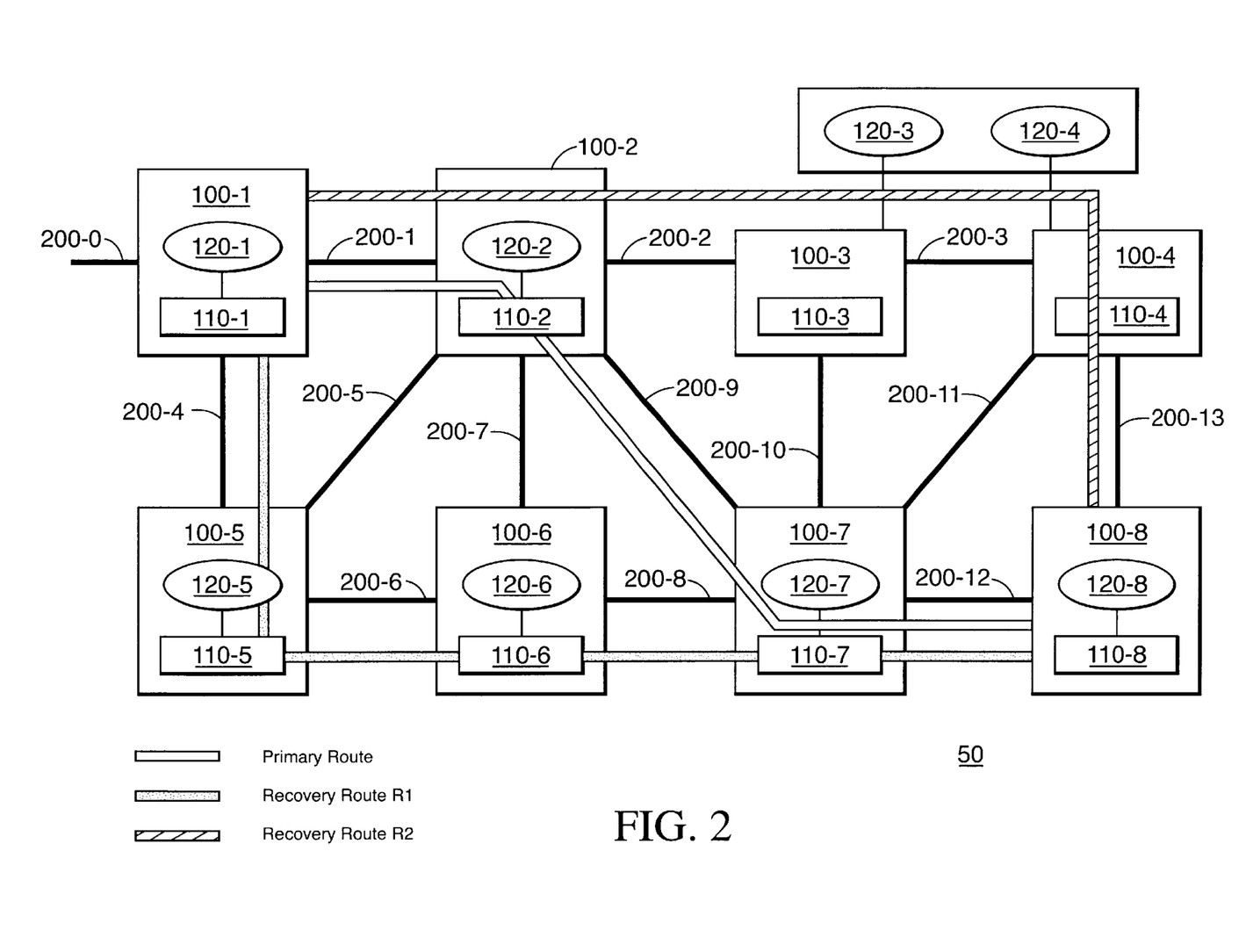
FIG. 2 shows the representative communications network showing a primary route for a connection and two possible recovery routes for the connection.

FIG. 2 depicts a connection C between switch 100-1 and switch 100-8 by means of a primary route over links 200-1, 200-9, 200-12. This primary route P is designated by the following switch-link table (Table A).

TABLE A

| | P | |
| --- | --- | --- |
| Switch | Input Link | Output Link |
| 100-1 | 200-0 | 200-1 |
| 100-2 | 200-1 | 200-9 |
| 100-7 | 200-9 | 200-12 |
| 100-8 | 200-12 | — |

Table A shows that link 200-1 connects 100-1 and 100-2, link 200-9 connects 100-2 and 100-7, and link 200-12 connects 100-7 to 100-8 for the given connection C. This route is the primary route for the given connection between 100-1 and 100-8 and it is calculated using any known routing algorithm. One such algorithm, for example, is link state routing in which the complete topology of the network and all its delays are known or experimentally measured and used, by a general purpose computer, to calculate an optimal route through the network.

Once the connection to be protected is assigned the above primary route, any failures that can disrupt this connection must be discovered and a recovery plan including one or more recovery routes must be determined for a failure condition derived from the failure or failures that disrupt the connection.

Recovery routes and plans may be chosen to satisfy certain quality of service constraints. One such example is that a certain fraction of the capacity of the links used in the recovery route not be exceeded unless the number of fault conditions exceeds a preset limit. It is possible to include protection against more than one fault condition. However, if the number of fault conditions on the connection exceeds a preset limit, the integrity of the connection is in serious jeopardy and a new path may have to be calculated after the failures have occurred. Another constraint that is applied to the choice of a recovery route is to minimize the total link capacity required for all the recovery plans. One way of meeting this constraint is to carefully share reserved backup bandwidth on the same links used when implementing different recovery plans for independent failures. That is, bandwidth of the same link is used for two or more independent failure conditions.

Yet another constraint to the recovery plan is to minimize the maximum number of changes in the mapping tables at each switch for every failure.

Figure 3A:
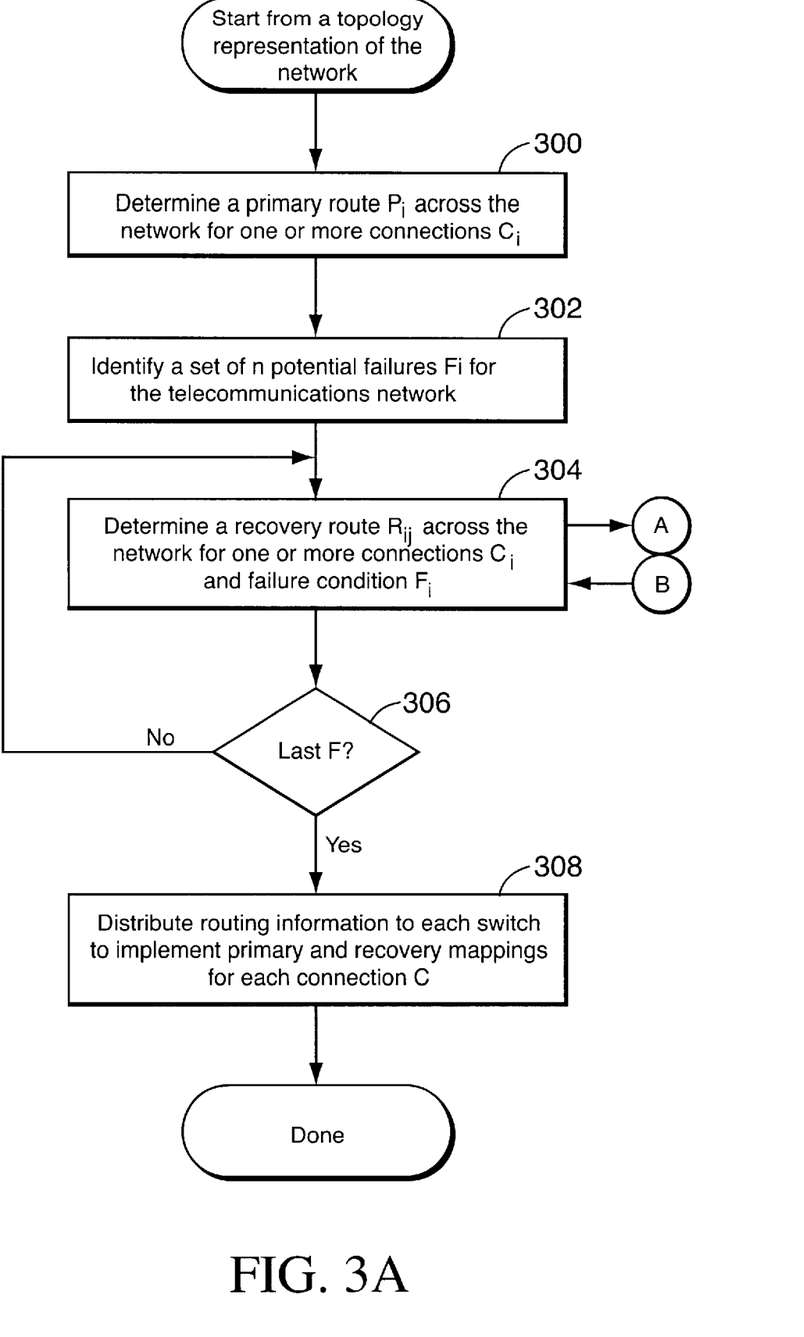
FIGS. 3A and 3B show a flow chart of a process for protecting a connection from a given number of failure conditions.
Figure 3B:
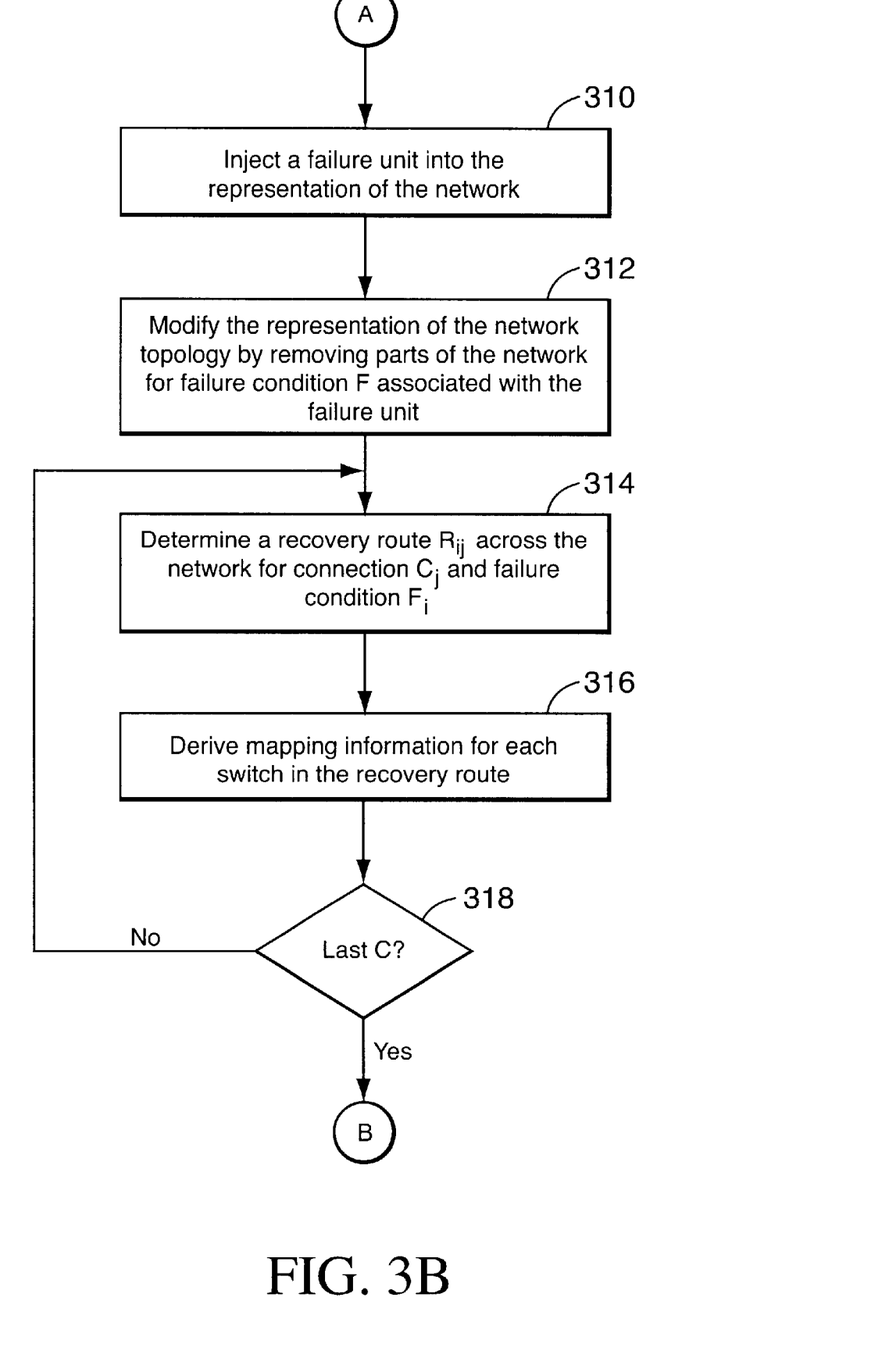

FIGS. 3A and 3B show a flow chart of a process for protecting a connection from a given number of failure conditions.

Referring to FIG. 3A, starting from a topological representation of the network, in step 300, a primary route $P_j$ across the network for each connection $C_j$, $1 \leq j \leq m$, is determined. This primary route, as mentioned above, in one embodiment, is based on standard, well-known routing algorithms such as link-state routing or some proprietary routing algorithm in other embodiments. The result is a set of individual primary connection mappings PM(j, k), one mapping for each switch $S_k$, $1 \leq k \leq t$, along the primary path for $C_j$, where $P_j=\{PM(j, S_1), PM(j, S_3), \ldots, PM(j, S_k)\}$.

Next, in step 302 a set of potential failure conditions $F_i$, $\forall 1 \leq i \leq n$, is identified. Failure conditions result from a failing link, switch or group of switches in the computer network that disrupt network connections and are determined using information about the network topology and characteristics of the equipment making up each element of the network.

Following this, in step 304, a recovery route $R_{i,j}$ for connection $C_j$ (step 316) is determined for each failure condition $F_i$, as determined by step 304. This results in a set of individual recovery connection mappings RM(i,j,k), one mapping for each switch $S_k$, where $R_{i,j}=\{RM(i,j,S_2), RM(i,j,S_3), \ldots, RM(ij,S_k)\}$. The combination of the primary P and recovery routes R for each protected connection determines the mapping information, $SM_k$, needed at each switch, where $SM_k$ is the union of PM(j, k) and RM(i,j,k) for all i and j at switch k. This routing information is distributed, in step 308, to each switch S needed to implement the primary and recovery routes for all connections. In one embodiment, the mapping information includes mapping or forwarding tables for more than one recovery route $R_{i,j}$ for each connection. The preplanning phase of the process is completed when the primary and recovery routes are distributed to the switch controllers of each of the switches involved in the connection to be protected.

At this point, all of the connections to be protected are said to be provisioned and every recurrence of this preplanning phase is a re-provisioning of the connections. Re-provisioning a set of connections can occur at any time, before or after a fault. New connections can be added by re-provisioning and at that time, new fault conditions and recovery plans can be formulated and the switches updated with new mapping information.

Figure 4:
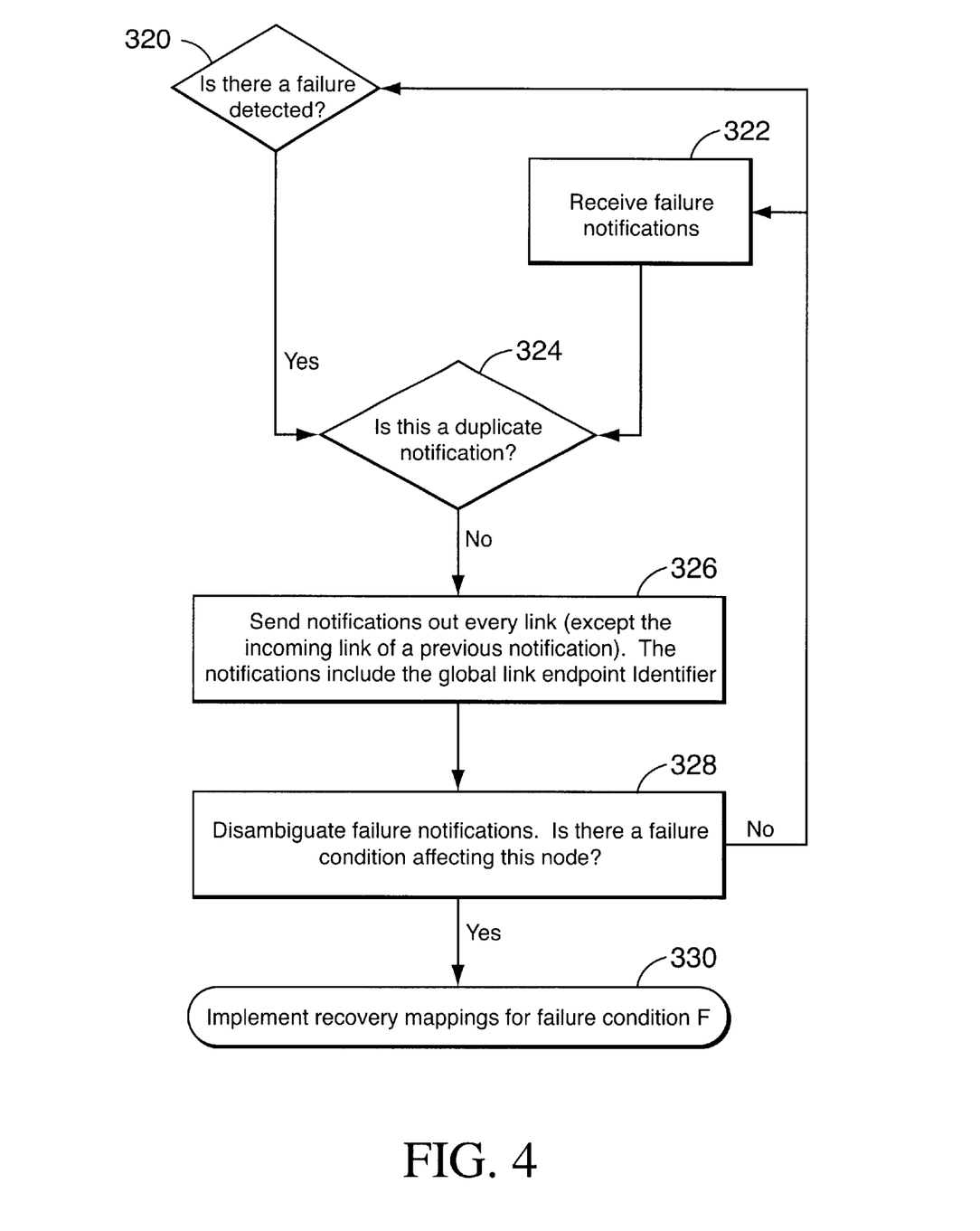
FIG. 4 shows a flow chart, in accordance with the present invention, of determining a failure condition from a failure in the network.

Referring now to FIG. 4, if a failure occurs as determined in step 320, switch controllers distribute failure notifications out of every link (except the incoming link of a previous notification) to the switch controllers of every switch, in step 326. From the failure notifications received at each switch controller in step 322, a failure condition is derived locally in step 328. Each switch then selects, based on the failure condition and after resolving any duplicate notifications in step 324, the set of mapping table entries that implements the recovery plan in step 330. If the failure condition does not affect any connections on a switch, no action is taken. The derivation of a failure condition is discussed in more detail below.

If and when the failure condition F is cleared, the affected switches S, in some embodiments, return to the primary route for a protected connection C. In one embodiment in accordance with the present invention, the primary route is restored only when all of the failures affecting the connection are cleared. In other embodiments, when a failure that affects one or more connections is cleared, not all of the affected connections are restored to their primary path at the same time. Instead, connection restoration to primary paths is completed in stages such that the recovery process limits the number of connections in transition at any one time. In another embodiment, the network is re-provisioned and new primary and recovery routes are established for all connections.

FIG. 3B shows a flow chart, in accordance with the present invention, for determining a recovery route across a network for a given failure condition as discussed above in connection with FIG. 3A. According to the chart, a representation of the topology of the network or model is created and a failure, in step 310, is injected into the network representation. The network representation is then modified, in step 312, based on a failure condition derived from the assumed failure, which means that inaccessible parts of the network that are associated with the failure condition are removed from the model. For example, referring to FIG. 2, if switch 100-2 fails, the failure condition is assumed to be the failure of the switch. Therefore, the switch 100-2 and all links, 200-1, 200-5, 200-7, 200-9 and 200-2 connected to that switch are removed.

For the purposes of planning a recovery route (step 314) when a link fails, the failure condition is assumed to be one of the switches connected to the link. For example, if link 200-9 fails, then either switch 100-2 or switch 100-7 is assumed to have failed. An arbitrary selection rule is used in this case to make the choice. One simple rule is that the higher numbered switch is assumed to have failed, i.e., 100-7. This means that switch 100-7 and all links connected to that switch are removed from the network representation. It should be noted here that for a link failure, the assumed failure condition could be a link failure rather than a switch failure and a recovery route could be found for a link failure. However, this distinction slows down the recovery process when a failure occurs in the network, because more information must be collected to determine whether a link or switch failed and more routing information must be distributed to the switches to handle the different types of failures. Because the distinction slows down the recovery process, all failures are reconciled into switch failures.

Two cases that require special treatment are those in which the failed link connects to a switch that is at either end of the connection. For the network of FIG. 2, these cases are the failure of link 200-1 or 200-4 and the failure of link 200-12 or 200-13. In either case, the rule need not be invoked to make a choice among two switches because the fact that an end-of-connection switch is involved resolves the choice instead. Nether end point switch, 100-1 nor 100-08, is allowed to be removed given the above failing links and connection 100-1–100-8 because no recovery route that preserves the connection would then be possible. Therefore, only failures of links that do not connect to end-of-connection switches create a choice that invokes the selection rule.

Next, according to FIG. 3B, a recovery route through the network is determined, in step 316, based on a routing algorithm. In this case, the routing algorithm preferably includes a set of quality of service constraints.

Continuing with the example in FIG. 2, a possible recovery route assuming that switch 100-2 failed, is given in Table B.

TABLE B

| | R1(C_j, 100-2) | |
|---|---|---|
| Switch | Input Link | Output Link |
| 100-1 | 200-0 | 200-4 |
| 100-5 | 200-4 | 200-6 |
| 100-6 | 200-6 | 200-8 |
| 100-7 | 200-8 | 200-12 |
| 100-8 | 200-12 | — |

This recovery route bypasses the failed switch and all of the links to that switch. Next, in step 328, mapping information, in the form of mapping tables, is compiled for each switch in the recovery route to implement the recovery route. This routing information is distributed to the switches as shown in FIG. 3A. Each switch uses the mapping table to initiate a recovery action when a failure occurs.

Figure 5:
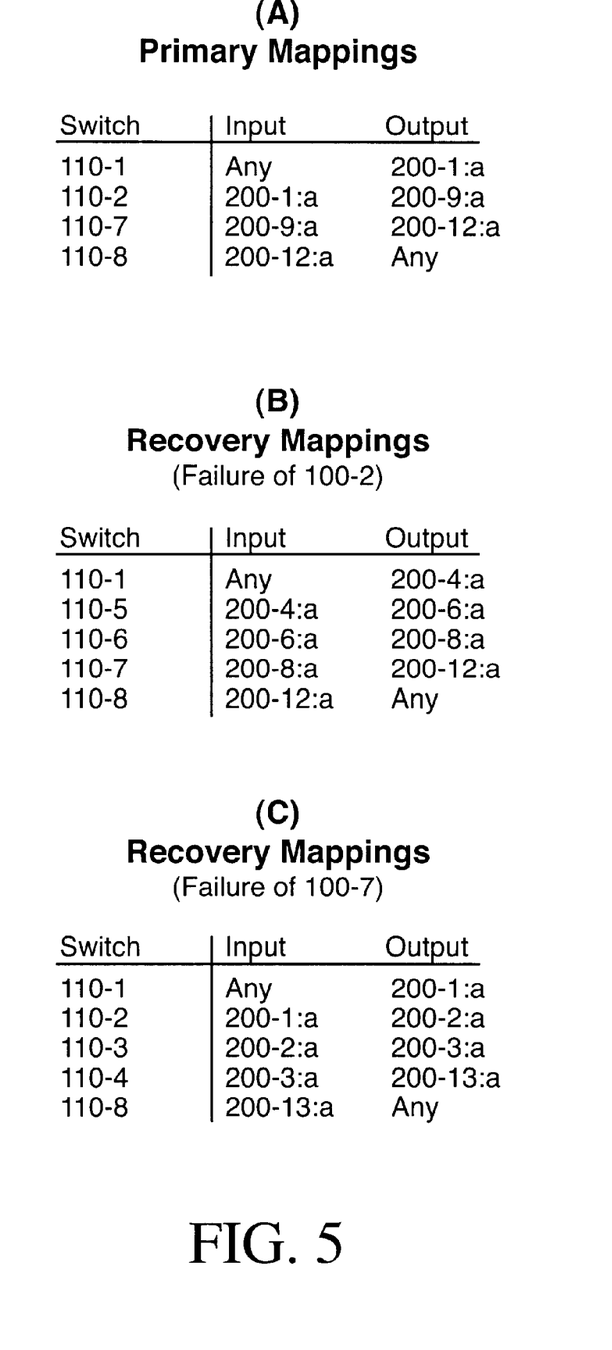
FIGS. 5A, 5B and 5C show mapping tables for the switches involved in a primary route and two recovery routes for a connection.

FIG. 5A shows the mapping tables for the primary route in Table A and FIG. 5B shows the mapping tables for a recovery path RI discussed below which is used when switch 100-2 fails. As can be seen from the figures, upon the receipt of failure information, switch 100-1 must switch from its primary path 200-0:a–200-1:a to recovery path 200-0:a–200-4: a, where "a" designates a port on the switches, as shown in FIG. 1B, and 200-0 is any input link to switch 110- 1. Switch 100-7 is also involved in changing its path from 200-9:a–200-12:a to 200-8:a–200-12:a as a result of the failure report. Switches 100-5 and 100-6 are also involved in implementing the recovery route.

Referring again to FIG. 3B, in step 316 a failure condition is determined from a failure unit in the network, where a failure unit is a failed link, switch or set of switches. Each switch in the network has the responsibility of reporting failures on link end-points that are connected to the switch, where a link end-point is given, in some embodiments, by a globally unique switch, link ordered pair (S, L) of numbers. A link end-point failure is detected by either active monitoring or by hardware traps as is well-known in the art. Reporting failures by a switch, link pair assures that a failure report from a switch uniquely identifies the link end-point failure to the entire network so that the failure reports can be reconciled as described below. Additionally, each switch uses the reconciled failure report to select a recovery action. Continuing with the example of FIG. 2, if a switch 100-2 fails, switches 100-1, 100-5, 100-6, 100-7 and 100-3 each report that a link end-point is non-functional. In particular, switch 100-1 reports end-point failure (100-1, 200-1); switch 100-5 reports (100-5, 200-5); switch 100-6 reports 100-7 reports (100-7, 200-9); and switch 100-3 reports (100-3, 200-2).

Failure reports are flooded throughout the network by forwarding the report out each link on a switch. This causes the switch controller of each switch to receive the failure reports. A switch reporting a failure has an identifier unique to the failure unit. Each switch controller then only re-floods a failure report not previously received based on this information and only to adjacent switches that did not send the report.

In the above case of receiving failure reports from switches 100-1, 100-5, 100-6, 100-7 and 100-3, the software knows from one or more of the failure unit reports, that the failure of switch 100-2 is consistent with the failure condition established during the recovery planning process. The software declares that the failure condition is the failure of switch 100-2 and recovery actions are taken at each of the switches using the failure of switch 100-2 as the selection criterion for the recovery action by indexing a table that lists recovery actions by link-endpoint failure identifiers. As discussed above, the recovery action taken by switch 100-1, for example, is to select a different path through the switch for the connection.

However, suppose, instead of switch 100-2 failing, that link 200-9 failed. In this case, the switches involved report link end-point failures, (100-7, 200-9) and (100-2, 200-9). Now, as discussed above, a choice arises because the recovery routes are based on failed switches, not failed links. End-point failure report (100-7, 200-9) suggests that switch 100-2 failed and a recovery route based on failure of switch 100-2 should be employed. End-point failure report (100-2, 200-9) suggests that switch 100-7 failed and a recovery plan based on failure of switch 100-7 should be employed. A decision must be made as to which switch shall be assumed to be the failed switch. An arbitrary selection rule suggested above, i.e., the highest numbered switch, allows each switch to make the same decision as to the failed switch. In this case, switch 100-7 is chosen as the failed switch and the recovery plan based on the failure of that switch is used. Thus, even though the actual failure was that of link 200-9, for the purposes of restoring the connections passing through that link, the failure of switch 100-7 is declared to be the failure condition. Connections passing through other links of that switch are not affected. Referring again to FIG. 2, Table C gives the recovery route, R2, when the failure condition is the failure of switch 100-7.

TABLE C

| | R2(C_j, 100-7) | |
|---|---|---|
| Switch | Input Link | Output Link |
| 100-1 | 200-0 | 200-1 |
| 100-2 | 200-1 | 200-2 |
| 100-3 | 200-2 | 200-3 |
| 100-4 | 200-3 | 200-13 |
| 100-8 | 200-13 | — |

This recovery route is planned by assuming that switch 100-7 and all links that connect to switch 100-7 are removed from the network. The connection $C_j$ can still be protected because the route in Table C does not require any links that connect to switch 100-7. Switch 100-2 participates in the recovery route because the failure condition is the failure of switch 100-7 and switch 100-2 has a mapping table that handles that possibility because failure of switch 100-7 is a failure condition that was planned for in the provisioning phase. No failed link is used in the recovery route because the failed link is removed when the failure condition is the failure of switch 100-7.

The use of a simple arbitrary selection rule has the advantage that failure reports are easy and quick to reconcile whether by the switches or by a central site receiving the reports.

It should be remarked that not all link failures result in a choice to be made. If a link fails that connects to a switch at either end of the connection, e.g., link 200-1, this failure is reported as (100-1, 200-1) and (100-2, 200-1). If connection $C_j$ (100-1, 100-8) is still to be protected switch 100-1 cannot become the failure condition. Switch 100-2 must become the failure condition instead. All links that connect to switch 100-2 are removed from the network model and a recovery route, e.g., R1, for the failure of switch 100-2 is implemented.

At the other end, if a failure of link 200-12 occurs, this failure is reported as (100-7, 200-12) and (100-8, 200-12). In this case the failure condition must be assumed to be the failure of switch 100-7 and not 100-8, in order to protect the connection. Therefore, the recovery route is based on the failure condition of failed switch 100-7 and recovery route R2 is then chosen protect the connection.

Multiple point failures are of course possible in a communications network and certain kinds of multiple point failures are protectable in accordance with the present invention. One such case is that in which two links fail which are not connected to the same switch. For example, in FIG. 2, if link 200-1 and 200-3 both fail, the reports become (100-1, 200-1), (100-2, 200-1), (100-3, 200-3), and (100-4, 200-3). These failure reports are consistent with two separate single-point failure conditions, the failure of switch 100-2 (because 100-1 cannot be removed) and the failure of switch 100-4 (the highest numbered switch for the failure). Recovery route R1 is then invoked to protect the connection.

Of course, if certain link failures occur, the connection may not be protectable. Say, for example, that link 200-1 and 200-4 both fail. Under the above rules, switch 100-2 and 100-5 are both declared to be the failure conditions. This severs the network such that a recovery route is not possible. Whether multiple link failures cause the network to be severed in such a way depends on the specific topology of the network in the vicinity of the failed links.

Similarly, the present invention can protect the connection from multiple switch failures, if the multiple switch failures do not sever the network. In one case, adjacent multiple switch failures are considered as a larger single-point failure and a recovery route may exist. For example, if switches 100-2 and 100-3 both fail, this is treated as a single point failure and recovery route R1 protects the connection. Even the failure of non-adjacent switches, in some cases, is not fatal to the connection. Switches 100-2 and 100-4 can both fail and recovery route R1 still applies.

Although the present invention has been described in considerable detail with reference to certain preferred versions thereof, other versions are possible. Therefore, the spirit and scope of the appended claims should not be limited to the description of the preferred versions contained herein.

What is claimed is:

1. In a communications network having a plurality of switches and transmission links that connect to the switches, a method of protecting at least one connection from failures in the network that disrupt the connection, the method comprising the steps of:
    determining, from a representation of the network, a primary path across the network for the connection;
    identifying, in the network, a set of failure units, that, if inoperable, would disrupt the connection;
    determining, from the representation of the network, a recovery plan for the connection, by deriving a failure condition from a failure of each identified failure unit, the failure condition being a switch associated with the failure unit, and by finding a recovery route through the network for the connection with the failure condition applied to the representation of the network, the recovery plan including all of the recovery routes found for the connection;
    deriving mapping information for each switch based on the primary and recovery plans;
    distributing the mapping information to each of the switches to implement the primary and recovery plans; and
    when the failure of a failure unit occurs,
        distributing information about the failure to each switch;
        determining at each switch a failure condition from the failure information; and
        selecting, at each switch and based on the failure condition, mapping information such that one of the recovery routes of the recovery plan for the connection is implemented.

2. A method of protecting at least one connection as recited in claim 1, wherein a failure unit is a failed link in the network.

3. A method of protecting at least one connection as recited in claim 1, wherein a failure unit is a failed switch.

4. A method of protecting at least one connection as recited in claim 1, wherein a failure unit is one or more failed switches and one or more failed links in the network.

5. A method of protecting at least one connection as recited in claim 1, wherein each switch includes a switch and a switch controller.

6. A method of protecting at least one connection as recited in claim 5, wherein at least one switch shares the switch controller with at least one other switch.

7. A method of protecting at least one connection as recited in claim 1, wherein the mapping information distributed to each of the switches includes at least one mapping table.

8. A method of protecting at least one connection as recited in claim 1,
    wherein each switch has a unique number assigned to it, there being a lowest numbered and highest numbered switch;
    wherein the failure information includes multiple reports each identifying a link as being non-operational, the identified link from each report being the same link; and
    wherein the failure condition is deemed the highest numbered switch connected to the identified link if the highest numbered switch is not an end-of-connection switch.

9. A method of protecting at least one connection as recited in claim 8,
    wherein the failure information is in the form of global uniquely numbered switch-link pairs; and
    wherein a recovery action at a switch is based on the unique switch-link pair, the switch of which is deemed the failure condition.

10. A method of protecting at least one connection as recited in claim 1,
    wherein the failure information includes reports of switch-link pairs found to be non-operational, the switch link pairs being a pair of numbers that identify a switch and link, there being a highest and lowest numbered switch and link; and
    wherein the step of implementing a recovery plan at a switch includes the steps of:
        examining the reports of the switch-link pairs to identify pairs having common link numbers;
        if the switches in the identified pairs are not end-of-connection switches, taking the recovery action at the switch based on an arbitrary selection rule regarding the switch numbers; and
        if one of the switches in the identified pair is an end-of-connection switch, taking recovery action based on the other switch in the identified pair.

11. A method of protecting at least one connection as recited in claim 10, wherein the arbitrary selection rule is the selection of the highest numbered switch.

12. A method of protecting at least one connection as recited in claim 1, wherein the report from a switch includes link end-point failures at which the failure is observed.

13. A method of protecting at least one connection as recited in claim 12, wherein the link end-point failure is reported from a switch is as a switch, link pair.

14. A method of protecting at least one connection as recited in claim 12, wherein link-end point failures are detected by active monitoring.

15. A method of protecting at least one connection as recited in claim 12, wherein link-end point failures are detected by hardware traps.

16. A method of protecting at least one connection as recited in claim 1, wherein each connection is protected against a predetermined number of fault conditions.

17. A method of protecting at least one connection as recited in claim 1,
wherein determination of a recovery route for a connection is subject to a quality of service constraint unless the number of fault conditions exceeds the predetermined number of fault conditions for the connection.

18. A method of protecting at least one connection as recited in claim 1, further comprising the step of, upon detection of all failures disrupting the connection being cleared, implementing a route in the primary plan by taking an action at each switch based on the failure clearance information.

19. A method of protecting at least one connection as recited in claim 1,
wherein there are a plurality of protected connections, each having primary and recovery plans;
wherein a single failure disrupts a subset of the plurality of connections; and
further comprising the step of, upon detection of the failure being cleared, implementing a route in the recovery plan for a limited number of the plurality of protected connections.

20. A method of protecting at least one connection as recited in claim 1,
wherein there are a plurality of protected connections, each having primary and recovery plans;
wherein a connection is added to the plurality of protected connections; and
further comprising the step of re-determining the recovery plans for the plurality of protected connections after the primary and recovery plans for the added connection are determined.

21. A method of protecting at least one connection as recited in claim 1,
wherein each failure is independent of any other failure disrupting the connection;
wherein each link used in each route of the recovery plan has a fixed capacity; and
wherein each route of the recovery plan uses a common set of links so that the total link capacity required for the recovery plan is minimized.

22. A method of protecting at least one connection as recited in claim 1,
wherein the routing information derived from primary and recovery plans has the form of mapping tables; and
wherein a route in the recovery plan is such that the number of changes in the mapping tables to change from primary route to a recovery route is minimized.

23. A method of protecting at least one connection as recited in claim 1,
wherein a switch includes a switch and a switch controller; and
wherein the step of distributing notice of the failure to each switch is performed by flooding failure reports to the switch controllers, each report containing a globally unique identifier of the failure unit.

24. A method of protecting at least one connection as recited in claim 1, wherein the steps of determining the primary and recovery plans are performed by a controller at a central site.

25. A method of protecting at least one connection as recited in claim 1,
wherein each switch includes a switch controller; and
wherein the steps of determining the primary and recovery plans are performed by the switch controllers.

26. A method of protecting at least one connection as recited in claim 1,
wherein each switch includes a switch and a switch controller; and
wherein at least one switch controller is remote from the switch it controls.

27. A method of protecting at least one connection as recited in claim 1,
wherein each switch includes a switch and a switch controller; and
wherein at least one switch controller is integrated with the switch it controls.

28. A method of protecting at least one connection as recited in claim 1,
wherein at least one switch is a virtual partition of a physical switch.

29. A method of protecting at least one connection as recited in claim 1,
wherein at least one link is a virtual partition of a physical link.

30. A method of protecting at least one connection as recited in claim 1,
wherein the step of determining a recovery plan for the connection includes the step of selecting recovery routes that minimize the number of switches taking recovery actions to implement the route.

31. In a communications network having a plurality of switches and transmission links that connect to the switches, a method of protecting at least one connection from a failure in the network that disrupts the connection, the method comprising the steps of:
providing mapping information to each switch to implement primary and recovery plans for the connection, wherein the recovery plans include routes derived under the assumption that switches associated with the failure are not present in the network;
transmitting a failure report from each switch that detects a failure;
determining, at each switch, a failure condition from the failure report, the failure condition being a switch associated with the failure; and
selecting, at each switch and based on the failure condition, mapping information that implements a recovery plan for the connection.

32. A method of protecting at least one connection from a failure in the network as recited in claim 31, wherein the mapping information includes at least one mapping table.

33. A method of protecting at least one connection from a failure in the network as recited in claim 31, wherein the failure is a failed link in the network.

34. In a communications network having switches and transmission links that connect to the switches, a method of determining a recovery route for a failure condition, the method comprising the steps of:

creating a representation of the topology of the communications network;

injecting a failure into the network representation;

modifying the representation by removing from the representation a switch that is associated with the failure and all links connected to the switch;

determining a recovery route through the representation of the modified network; and deriving recovery actions, in the form of mapping information, for each switch in the recovery route.

35. A method of determining a recovery route as recited in claim 34, wherein the injected failure is a link failure; and wherein the switch associated with the failure is a switch that is connected to the failed link and is not an end-of-connection switch.

36. A method of determining a recovery route as recited in claim 35, wherein the switch associated with the failure has a higher number designation than any other switch connected to the failed link.

37. A method of determining a recovery route as recited in claim 34, wherein the injected failure is a switch failure; and wherein the switch associated with the failure is the failed switch.

38. A method of determining a recovery route as recited in claim 34, wherein the recovery route is based on at least one quality of service metric.

39. A method of determining a recovery route as recited in claim 38, wherein the recovery route is based on a plurality of quality service metrics.

* * * * *